(12) United States Patent
Creek et al.

(10) Patent No.: US 6,572,199 B1
(45) Date of Patent: Jun. 3, 2003

(54) FLANGED TUBULAR AXLE SHAFT ASSEMBLY

(75) Inventors: Steve W Creek, Shelby Township, MI (US); Tim P Raleigh, Macomb Township, MI (US)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 10/115,800

(22) Filed: Apr. 3, 2002

(51) Int. Cl.[7] .............................................. B60B 35/00
(52) U.S. Cl. ...................... 301/124.1; 301/126; 301/132
(58) Field of Search ............................. 301/124.1, 125, 301/126, 132, 35.53, 112, 117, 111.01, 111.02, 111.03, 111.04, 111.07; 403/359; 29/525, 515, 516, 522.1; 188/218 XL

(56) References Cited

U.S. PATENT DOCUMENTS

| | | | | |
|---|---|---|---|---|
| 310,846 A | * | 1/1885 | Dyson et al. | 29/894.012 |
| 2,490,594 A | * | 12/1949 | Madden | 411/180 |
| 2,544,304 A | * | 3/1951 | Eckenbeck et al. | 411/180 |
| 3,005,259 A | * | 10/1961 | Benya et al. | 29/505 |
| 4,118,134 A | * | 10/1978 | Mansel | 403/282 |
| 4,135,766 A | * | 1/1979 | Trautloff | 301/114 |
| 4,408,786 A | * | 10/1983 | Stuemky | 285/256 |
| 4,417,462 A | * | 11/1983 | Palovcik | 72/370.1 |
| 4,588,322 A | * | 5/1986 | Shoemaker et al. | 403/1 |
| 4,768,839 A | * | 9/1988 | Spindler | 301/124.1 |
| 4,986,607 A | * | 1/1991 | Hofmann et al. | 310/124.1 |
| 5,143,427 A | * | 9/1992 | Dick | 301/111.01 |
| 5,213,250 A | | 5/1993 | Simon | 228/114 |
| 5,536,098 A | * | 7/1996 | Schwarzler | 403/259 |
| 6,059,378 A | * | 5/2000 | Dougherty et al. | 301/124.1 |

* cited by examiner

*Primary Examiner*—S. Joseph Morano
*Assistant Examiner*—Long Bao Nguyen
(74) *Attorney, Agent, or Firm*—Laura C. Hargitt

(57) ABSTRACT

A flanged axle shaft assembly includes a shaft having a tubular wall and an open end, a flange hub having a central opening fitted over the shaft and secured to the open end, and an end wedge secured in the open end and urging the shaft wall into compressive engagement with the flange hub opening to provide for transmission of forces between the shaft and the flange hub. In a preferred method of assembly, the shaft is formed with a flared inner end stop against which the hub flange is mounted about the shaft. Forcing the end wedge into the shaft inner end expands the shaft wall into a characterized, such as splined, surface of the hub central opening to provide a high torque mechanical driving connection. The hub flange and a head of the end wedge are preferably also laser welded to the shaft.

14 Claims, 2 Drawing Sheets

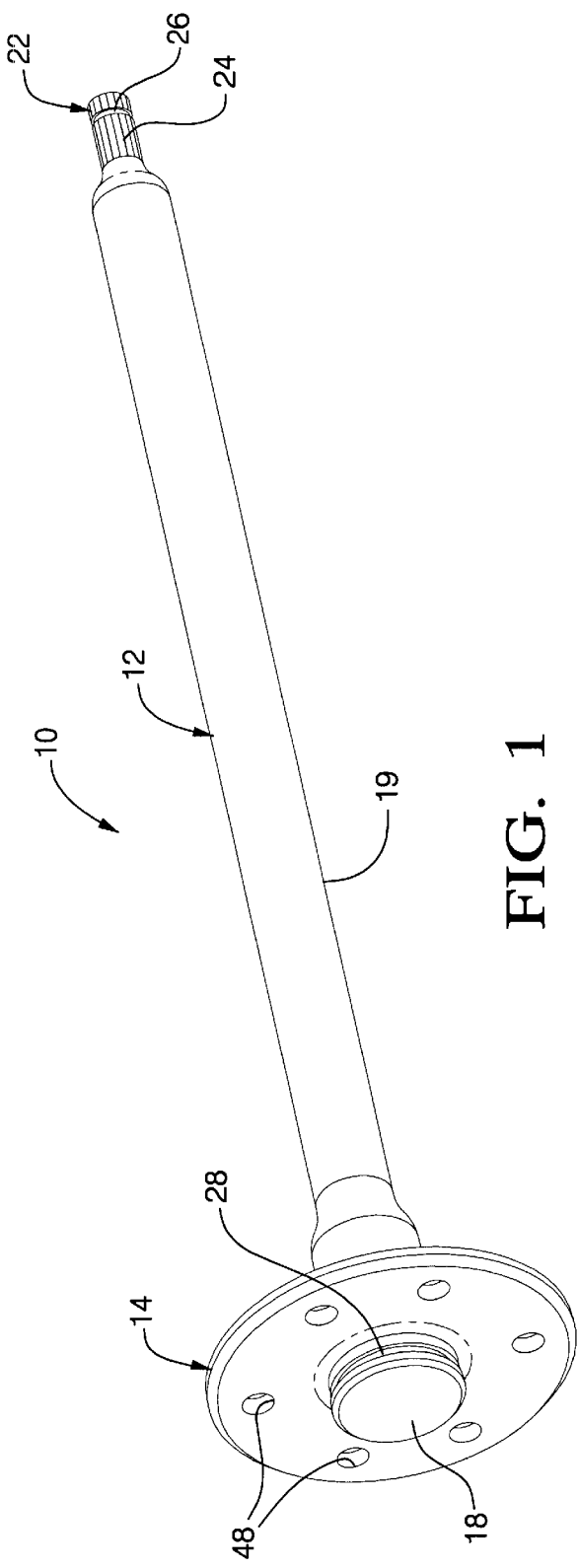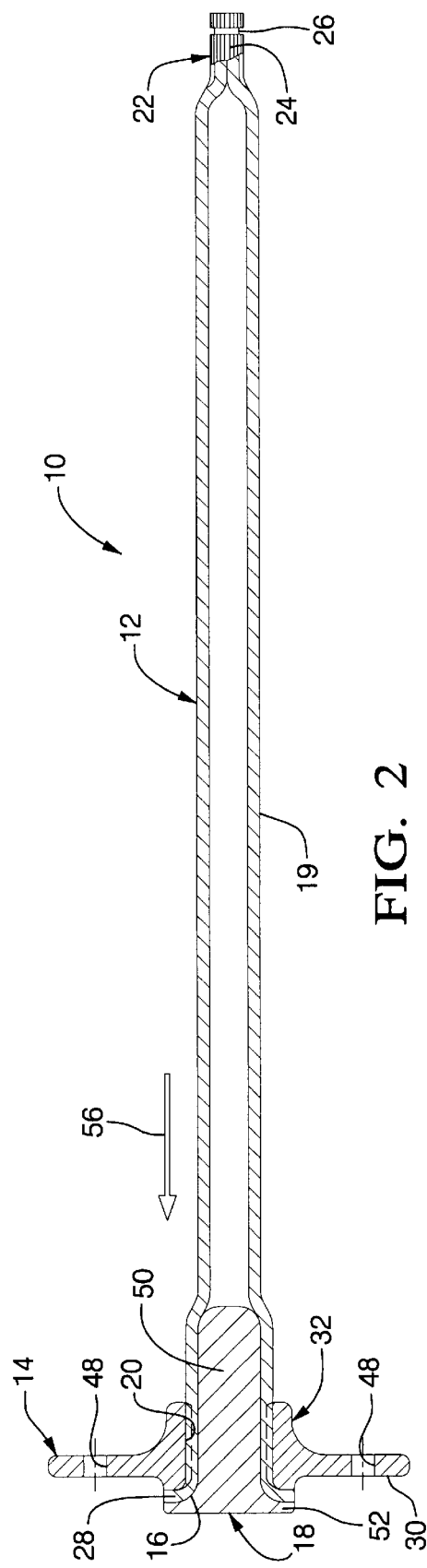

FLANGED TUBULAR AXLE SHAFT ASSEMBLY

TECHNICAL FIELD

This invention relates to axle shafts for vehicles and more particularly to an assembly having a tubular axle shaft with a flange member fixed at the axially outer end of the shaft.

BACKGROUND OF THE INVENTION

It is known in the art relating to vehicle axle shafts to form such shafts as one piece forgings to transmit the considerable torque and loads applied at the wheel end of an axle housing. It is also known to utilize two piece axle shafts where a solid shaft is friction welded to a flange hub. Friction welding of a tube assembly to a flange hub has also previously been developed.

SUMMARY OF THE INVENTION

The present invention provides an improved form of axle shaft assembly in which a mechanical connection is provided between a tubular shaft and a flange hub mounted on an axially outer open end of the shaft. The assembly includes an end wedge forced into the open end of the shaft and expanding the wall of the shaft to compress the wall into engagement with a central opening in the flange hub to provide for transmission of torque and axial forces between the flange hub and the shaft.

In a preferred embodiment, the outer end of the shaft is expanded and provided with a flared end. The flange hub includes a hub portion which is fitted tightly onto the expanded portion of the shaft and against the flared end. Preferably the flange hub central opening includes a characterized surface with spline like features into which the shaft wall is expanded by insertion of the end wedge so that a mechanical torque transmission connection is provided by expansion of the tube into the recesses between the spline like projections. Other forms of characterized surfaces may also be utilized.

The end wedge preferably extends inward of the flange hub to provide a solid support for the expanded portion of the shaft on which a wheel bearing is mounted. The shaft is preferably laser welded to the flange hub at the inner and outer edges of the hub portion and to a head of the end wedge adjacent the outer end of the hub portion.

The inner end of the shaft may be reduced in diameter, splined and provided with additional features for attaching the inner end to an axle drive assembly, such as a differential gear set. The inner end may be hollow with thickened wall sections or may be compressed to a substantially solid end portion.

The invention provides a novel design and method for mechanically attaching a flange hub to a tubular axle shaft including laser welding of the flange hub to the shaft. Benefits of the design and method include:

1. Use of a generally flat flange hub which is more easily manufactured than conventional one piece axle shaft forgings.

2. Significant weight reduction of the axle due to variable wall thickness tubing which is utilized in place of solid bar stock.

3. Use of a mechanical joint between the flange hub and the axle shaft tube formed in part by an end wedge which deforms the axle tube into spline like features or other characterized surface features on the inner diameter of the flange hub central opening.

4. The use of laser welding for additional positive attachment of the shaft tube to the flange hub and the end wedge.

5. Reduced heat treating cycle time due to the lower mass of the tube and reduced internal stresses from the laser welding process.

These and other features and advantages of the invention will be more fully understood from the following description of certain specific embodiments of the invention taken together with the accompanying drawings.

BRIEF DESCRIPTION OF THE DRAWINGS

In the drawings:

FIG. 1 is an isometric view of a flanged axle shaft assembly formed according to the invention;

FIG. 2 is a cross-sectional view of the assembly of FIG. 1 illustrating the manner of installing the preformed flange hub on the hollow axle tube.

DESCRIPTION OF THE PREFERRED EMBODIMENT

Figure 3:
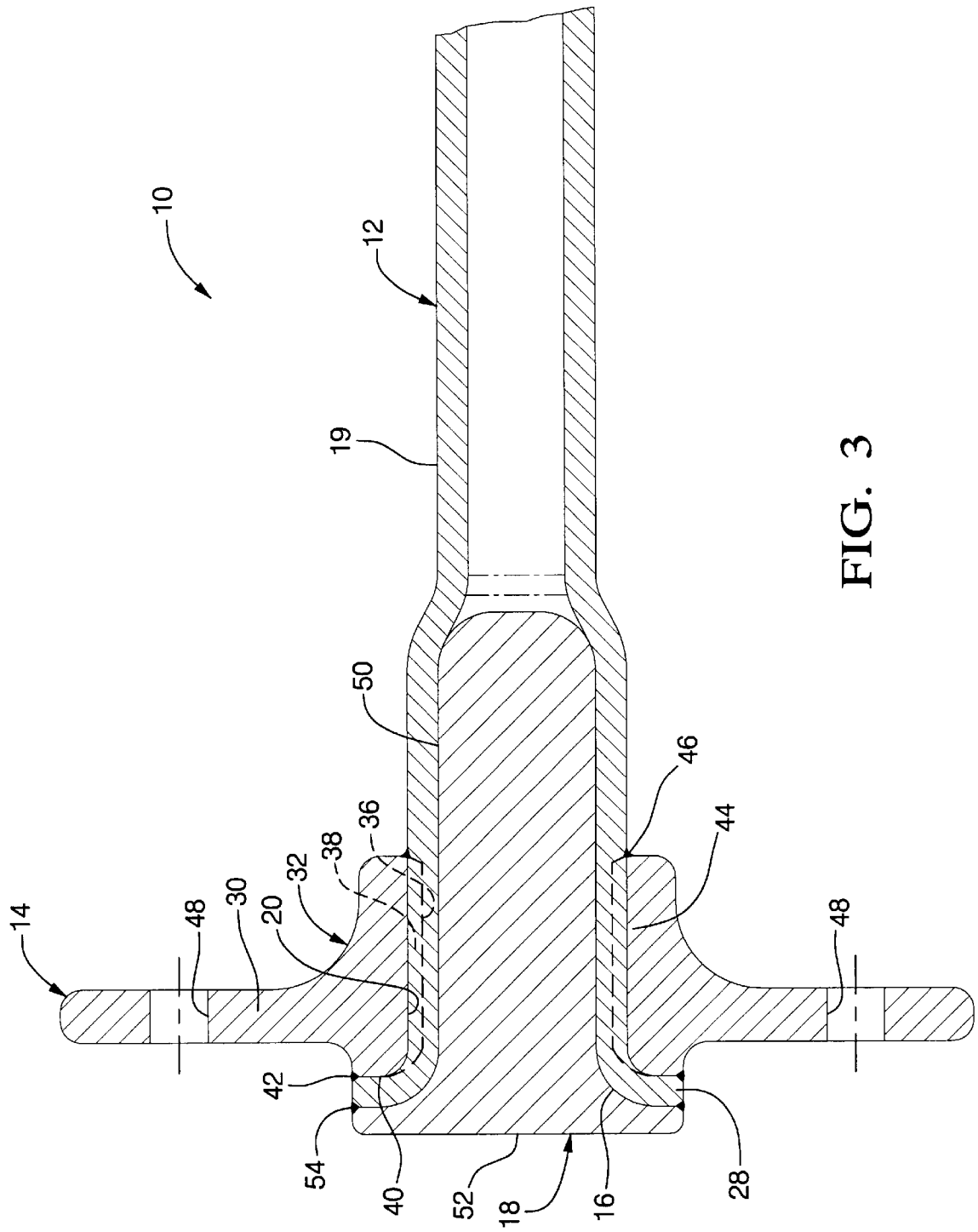
FIG. 3 is an enlarged cross-sectional view of the outer end of the shaft assembly.

Referring now to the drawings in detail, numeral 10 generally indicates a flanged axle shaft assembly according to the invention. Assembly 10 includes a tubular shaft 12, a flange hub 14 mounted on an open outer end 16 of the shaft and an end wedge 18 secured in the open end 16. The end wedge 18 expands the tubular wall 19 of the shaft 12 into compressive engagement with a central opening 20 in the flange hub 14 to provide a mechanical connection that supports transmission of substantial torsional and axial forces between the shaft and the flange.

In a preferred embodiment, the shaft tube is produced from drawn over mandrel high strength low alloy steel tubing which is available and used for other purposes. The shaft tube is formed with adequate wall thickness and strength to meet vehicle loading requirements. An inner end 22 of the shaft is reduced in diameter to provide a thickened wall and is preferably provided with attachment and drive features including, for example, splines 24 and a locking groove 26. If desired, the inner end 22 may be sufficiently reduced in diameter to form an essentially solid inner end for connection of the shaft 12 to an axle drive assembly such as a differential bevel drive gear, not shown.

The axially outer end 16 of the shaft may be expanded to a larger diameter than the central portion of the tubular shaft 12 between the inner and outer ends 22, 26. A portion of the outer end 16 is flared radially outward at 28 to provide an end stop.

The flange hub 14 may be forged or otherwise formed and includes a generally flat disk portion 30 connecting radially inwardly with an enlarged hub 32 having the central opening 20. The interior of the opening 20 is preferably provided with a characterized surface having a desired degree of roughness or characterized features including projections and alternate recesses as desired. In the preferred embodiment the characterized surface is formed with spline like projections 36, which extend inward and define groove like recesses 38 between the projections 36 as shown in FIG. 3. An axially outer end 40 of the hub 32 is configured to closely engage the flared end stop 28 of the tubular shaft 12 and is preferably secured to the shaft by laser welding at 42. An axially inner end 44 of the hub 32 is preferably also laser welded to the tubular shaft at 46. The flat disk portion 30 of the flange hub 14 includes openings 48 in which wheel studs are subsequently installed for the attachment of a wheel to the finished axle shaft assembly 10.

The end wedge 18 is formed with an extended near cylindrical body 50 which may be slightly wedge shaped, having a smaller diameter at its inner end than at the outer end adjacent an enlarged head 52. The outer periphery of the head 52 is preferably also laser welded to the flared end stop at 54.

Upon installation of the end wedge 18, the wedge expands the shaft wall at the outer end 16 of the shaft 12 and forces the outer surface of the tube wall into the recesses 38 between the spline like projections 36 in the central opening 20 of the hub 32. The flange hub 14 and the shaft 12 are thus mechanically interlocked at a joint which provides a high level of capability to transmit torque delivered between the axle shaft and the attached hub.

Manufacture of the preferred embodiment of tubular axle shaft assembly 10 is accomplished as follows. A high strength low alloy steel tube having walls with adequate strength for use as an axle shaft is modified by reducing the diameter of an inner end 22 and optionally expanding the diameter of an outer end 16. The outer end is terminated by an outwardly flared end stop 28.

A forged or otherwise formed flange hub 14 is then installed on the shaft 12 by sliding the flange hub over the small inner end 22 of the shaft in the direction of arrow 56 until the hub portion 32 engages the flared end stop 28 of the shaft. The central opening 20 of the flange hub includes spline like projections 36 with alternating recesses 38 that engage the outer surface of the enlarged outer end of the shaft.

The end wedge 18 is then forced into the hollow interior of the enlarged outer end 40 of the shaft so that the body 50 of the wedge extends within the shaft and the head 52 of the wedge engages the outer side of the flared end stop 28 of the shaft. As the body 50 of the end wedge is inserted into the shaft, it expands the wall of the outer end 16 into engagement with the splines 36 and recesses 38 of the hub central opening 20 to provide a high torque mechanical connection. The body 50 of the end wedge extends through the hub opening 20 into an adjacent expanded portion of the outer end 40 of the shaft and provides a solid support for the walls of the shaft in this region for the subsequent installation of a wheel bearing on the outer surface of the enlarged outer end of the tube.

The shaft assembly is then preferably fastened together by laser welding of the tubular axle shaft to opposite ends of the flange hub and to the head of the end wedge. The assembly is then heat treated followed by machining of necessary portions of the assembly, such as the flat disk portion of the flange hub and the bearing mounting surface or journal of the axle shaft enlarged outer end 16. The splines 24 and locking groove 26 may also be machined or otherwise formed, as by rolling, at the shaft inner end at that time.

While the invention has been described by reference to certain preferred embodiments, it should be understood that numerous changes could be made within the spirit and scope of the inventive concepts described. Accordingly, it is intended that the invention not be limited to the disclosed embodiments, but that it have the full scope permitted by the language of the following claims.

What is claimed is:

1. A flanged axle shaft assembly comprising:
   a shaft having a tubular wall and an open end;
   a flange hub having a central opening fitted over the shaft and secured to the open end; and
   an end wedge secured in the open end and urging the shaft wall into compressive engagement with the flange hub opening to provide for transmission of forces between the shaft and the flange hub wherein the end wedge extends into the shaft and engages the interior of the tubular wall axially inward of the flange hub to provide solid support for a wheel bearing engagable with the exterior of the shaft.

2. A flanged axle shaft assembly comprising:
   a shaft having a tubular wall and an open end;
   a flange hub having a central opening fitted over the shaft and secured to the open end; and
   an end wedge secured in the open end and urging the shaft wall into compressive engagement with the flange hub opening to provide for transmission of forces between the shaft and the flange hub wherein the shaft is connected by laser welding to the flange and to the end wedge.

3. A flanged axle shaft assembly comprising:
   a shaft having a tubular wall and an open end;
   a flange hub having a central opening fitted over the shaft and secured to the open end; and
   an end wedge secured in the open end and urging the shaft wall into compressive engagement with the flange hub opening to provide for transmission of forces between the shaft and the flange hub wherein the open end of the shaft has an outwardly flared portion and the flange hub has a hub portion engaging an axially inner surface of the flared portion and wherein the end wedge has a head engaging an axially outer surface of the flared portion.

4. An assembly as in claim 3 wherein the outwardly flared portion of the shaft is laser welded to the hub portion and the end wedge.

5. An assembly as in claim 4 wherein an axially inner end of the hub is also laser welded to the shaft.

6. An assembly as in claim 5 wherein the flange hub central opening includes a characterized inner surface having recesses into which a portion of the shaft wall is deformed by the end wedge for increasing the capability of force transmission between the tube and the hub.

7. An assembly as in claim 6 wherein the characterized inner surface includes spline-like projections.

8. A flanged axle shaft assembly comprising:
   a shaft having a tubular wall and an open end;
   a flange hub having a central opening fitted over the shaft and secured to the open end; and
   an end wedge secured in the open end and urging the shaft wall into compressive engagement with the flange hub opening to provide for transmission of forces between the shaft and the flange hub wherein the shaft has an inner end axially opposite to the open end, said inner end being reduced in diameter and including external means for connecting the shaft to an axle drive assembly.

9. An assembly as in claim 8 wherein said external means include splines for connecting with the drive assembly.

10. A method of making a tubular axle shaft assembly comprising the steps of:
    providing a high strength low alloy steel tubular shaft having a wall with adequate strength for use as an axle shaft;
    assembling a central opening in a preformed flange hub with a close fit on to an open outer end of the shaft;

forcing an end wedge into the open outer end of the shaft to expand the wall of the shaft outer end into force transmitting engagement with an inner surface of said central opening to provide a force transmitting mechanical connection; and fixing the flange hub and the end wedge in position at the inner end of the tubular shaft.

11. A method as in claim 10 wherein the fixing step includes laser welding the flange hub and the end wedge to the tubular shaft.

12. A method as in claim 11 including, prior to the fixing step:

expanding the shaft diameter adjacent the outer end and flaring the outer end to form an end stop;

positioning the flange hub against an inner side of the end stop; and positioning a head of the end wedge against an outer side of the end stop.

13. A method as in claim 10 including providing a characterized inner surface in the flange hub opening having projections and recesses against which the tubular shaft wall is expanded to make said mechanical connection.

14. A method as in claim 10 including reducing the diameter of the shaft inner end to provide an increased wall thickness and forming retaining and drive connectors on the inner end for connection of the shaft to an axle drive assembly.

* * * * *